(12) United States Patent
Ojima et al.

(10) Patent No.: US 11,846,583 B2
(45) Date of Patent: Dec. 19, 2023

(54) INSPECTION METHOD AND INSPECTION SYSTEM

(71) Applicant: Panasonic Intellectual Property Management Co., Ltd., Osaka (JP)

(72) Inventors: Takanobu Ojima, Osaka (JP); Hideto Motomura, Kyoto (JP); Rina Akaho, Osaka (JP); Yoshinori Matsui, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/638,248

(22) PCT Filed: Aug. 28, 2020

(86) PCT No.: PCT/JP2020/032537
§ 371 (c)(1),
(2) Date: Feb. 25, 2022

(87) PCT Pub. No.: WO2021/059858
PCT Pub. Date: Apr. 1, 2021

(65) Prior Publication Data
US 2022/0326145 A1 Oct. 13, 2022

(30) Foreign Application Priority Data
Sep. 27, 2019 (JP) ................. 2019-178081

(51) Int. Cl.
*G01N 21/27* (2006.01)
*G01N 21/25* (2006.01)

(52) U.S. Cl.
CPC ........... *G01N 21/27* (2013.01); *G01N 21/255* (2013.01)

(58) Field of Classification Search
CPC ...... G01N 21/27; G01N 21/25; G01N 21/255; G01J 3/51
See application file for complete search history.

(56) References Cited

U.S. PATENT DOCUMENTS

| | | | |
|---|---|---|---|
| 2014/0242271 A1* | 8/2014 | Prakash | G01J 3/504 356/73 |
| 2015/0131090 A1* | 5/2015 | Osumi | G01J 3/1256 356/300 |

(Continued)

FOREIGN PATENT DOCUMENTS

| | | |
|---|---|---|
| JP | 9-203664 A | 8/1997 |
| JP | 2006-292578 A | 10/2006 |

(Continued)

OTHER PUBLICATIONS

International Search Report of PCT application No. PCT/JP2020/032537 dated Oct. 13, 2020.

*Primary Examiner* — Tarifur R Chowdhury
*Assistant Examiner* — Carlos Perez-Guzman
(74) *Attorney, Agent, or Firm* — McDermott Will & Emery LLP

(57) ABSTRACT

Provided are an inspection method, a program, and an inspection system capable of improving accuracy of inspecting a color of a surface of an object. The inspection method includes acquisition step and comparison step. Acquisition step is a step of acquiring a target image of a surface of an object obtained by an imaging system imaging the surface of the object illuminated by an illumination system. Comparison step is a step of comparing a color of an attention region on the target image with a color of a reference region. The reference region is a region of a reference image of a surface of a reference object as a reference of a color of the object, and a region corresponding to a combination of an incident (Continued)

angle of light from the illumination system and a reflection angle of light to the imaging system in the attention region.

19 Claims, 15 Drawing Sheets

(56) References Cited

U.S. PATENT DOCUMENTS

| | | | |
|---|---|---|---|
| 2016/0140734 A1 | 5/2016 | Kato | |
| 2020/0378887 A1* | 12/2020 | Teraoka | ............... G01N 21/55 |
| 2021/0004987 A1 | 1/2021 | Matsuura et al. | |

FOREIGN PATENT DOCUMENTS

| | | | |
|---|---|---|---|
| JP | 2013-238576 A | 11/2013 |
| JP | 2015-155892 | 8/2015 |
| JP | 2016-006416 A | 1/2016 |
| JP | 2016-038221 A | 3/2016 |
| JP | 2019-185730 A | 10/2019 |

\* cited by examiner

INSPECTION METHOD AND INSPECTION SYSTEM

CROSS-REFERENCE TO RELATED APPLICATIONS

This application is a U.S. national stage application of the PCT International Application No. PCT/JP2020/032537 filed on Aug. 28, 2020, which claims the benefit of foreign priority of Japanese patent application No. 2019-178081 filed on Sep. 27, 2019, the contents all of which are incorporated herein by reference.

FIELD OF THE INVENTION

The present disclosure relates to an inspection method, a program, and an inspection system. In particular, the present disclosure relates to the inspection method, the program, and the inspection system for inspecting a color of a surface of an object using an image.

DESCRIPTION OF THE RELATED ART

PTL 1 discloses a coloring inspection apparatus. The coloring inspection apparatus disclosed in PTL 1 includes a camera, an arithmetic processing device, and an illuminator. The camera has three spectral sensitivities that are linearly converted equivalently with CIEXYZ color-matching functions. Further, the camera captures an image of an object to acquire image data, and transmits the image data to the arithmetic processing device. The image data has three spectral sensitivity values obtained in accordance with the three spectral sensitivities. The arithmetic processing device converts the image data acquired by the camera into tristimulus values in a CIEXYZ color system to acquire coloring data. The arithmetic processing device performs arithmetic processing for normalizing the coloring data and converting the coloring data into xyz. The illuminator irradiates an automobile that is an example of a measurement object. The coloring inspection apparatus inspects a color by calculating a color distribution matching index indicating an overlapping ratio of two xyz chromaticity histogram distributions of an inspection object and a reference object.

CITATION LIST

Patent Literature

PTL 1: Unexamined Japanese Patent Publication No. 2015-155892

SUMMARY OF THE INVENTION

The appearance of the color of the inspection object (object to be measured or an object) may be affected by the shape of the inspection object. That is, the inspection object may have angle dependency with respect to reflection of light from the illuminator. For example, even if the surface of inspection object is painted in one color, the inspection object looks different in color depending on a portion of the inspection object. In PTL 1, the shape of the inspection object is not considered to inspect the color.

An object of the present disclosure is to provide an inspection method, a program, and an inspection system capable of improving accuracy of inspecting a color of the surface of an object.

An inspection method according to one aspect of the present disclosure includes an acquisition step and a comparison step. The acquisition step is a step of acquiring a target image of a surface of an object acquired by an imaging system imaging the surface of the object illuminated by an illumination system. The comparison step is a step of comparing a color of an attention region on the target image with a color of a reference region. The reference region is a region of a reference image of a surface of a reference object as a reference of a color of the object. Further, the reference region is a region corresponding to a combination of an incident angle of light from the illumination system and a reflection angle of light to the imaging system in the attention region.

A program according to one aspect of the present disclosure is a program for causing at least one processor to execute the inspection method.

An inspection system according to one aspect of the present disclosure includes an acquisition part and a comparator. The acquisition part acquires a target image of a surface of an object acquired by an imaging system imaging the surface of the object illuminated by an illumination system. The comparator compares a color of an attention region on the target image with a color of a reference region. The reference region is a region of a reference image of a surface of a reference object as a reference of a color of the object. Further, the reference region is a region corresponding to a combination of an incident angle of light from the illumination system and a reflection angle of light to the imaging system in the attention region.

According to the aspects of the present disclosure, the accuracy of inspecting the color of the surface of the object can be improved.

DETAILED DESCRIPTION OF THE PREFERRED EMBODIMENTS

(1) Exemplary Embodiment (1.1) Outline

Figure 1:
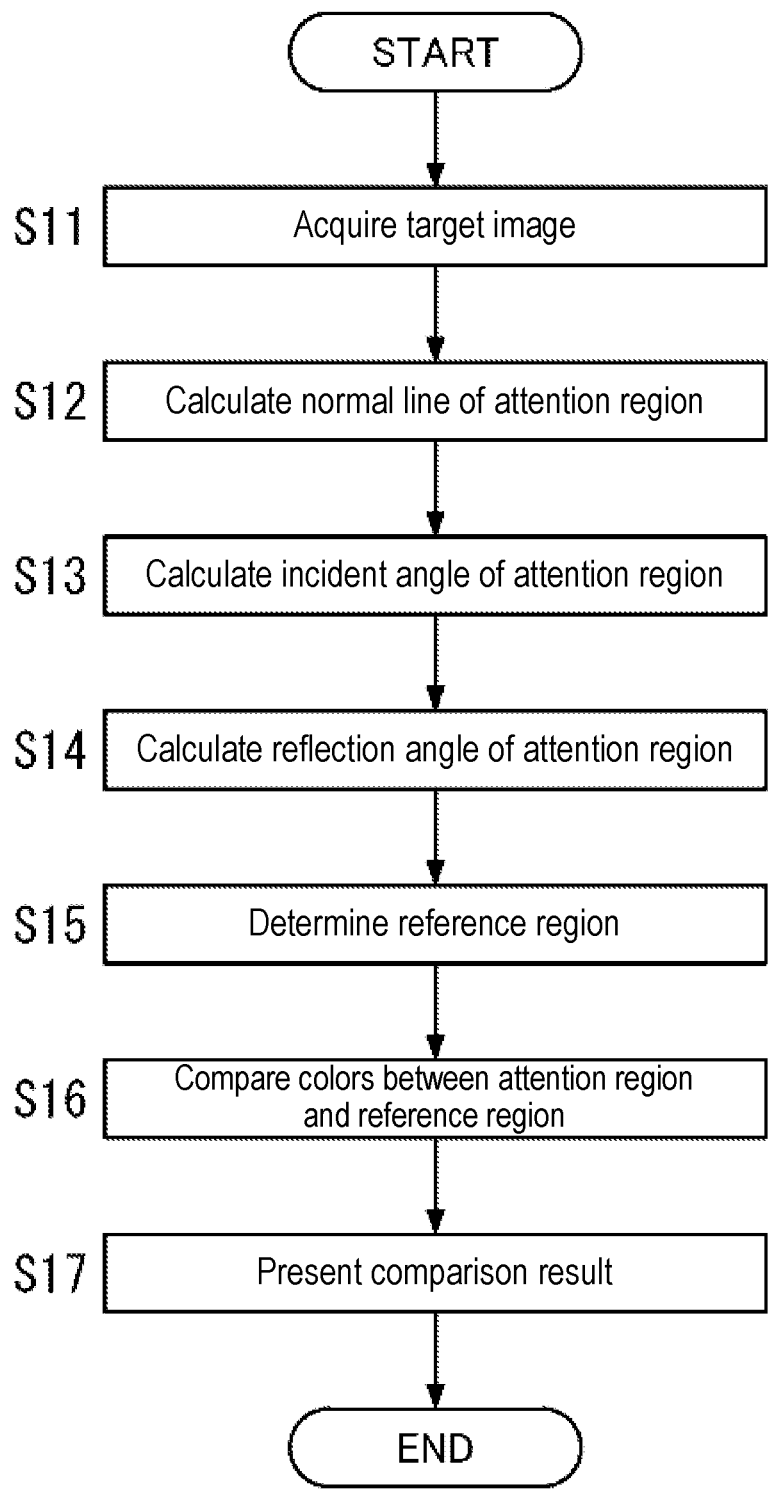
FIG. 1 is a flowchart of an inspection method according to one exemplary embodiment.
Figure 2:
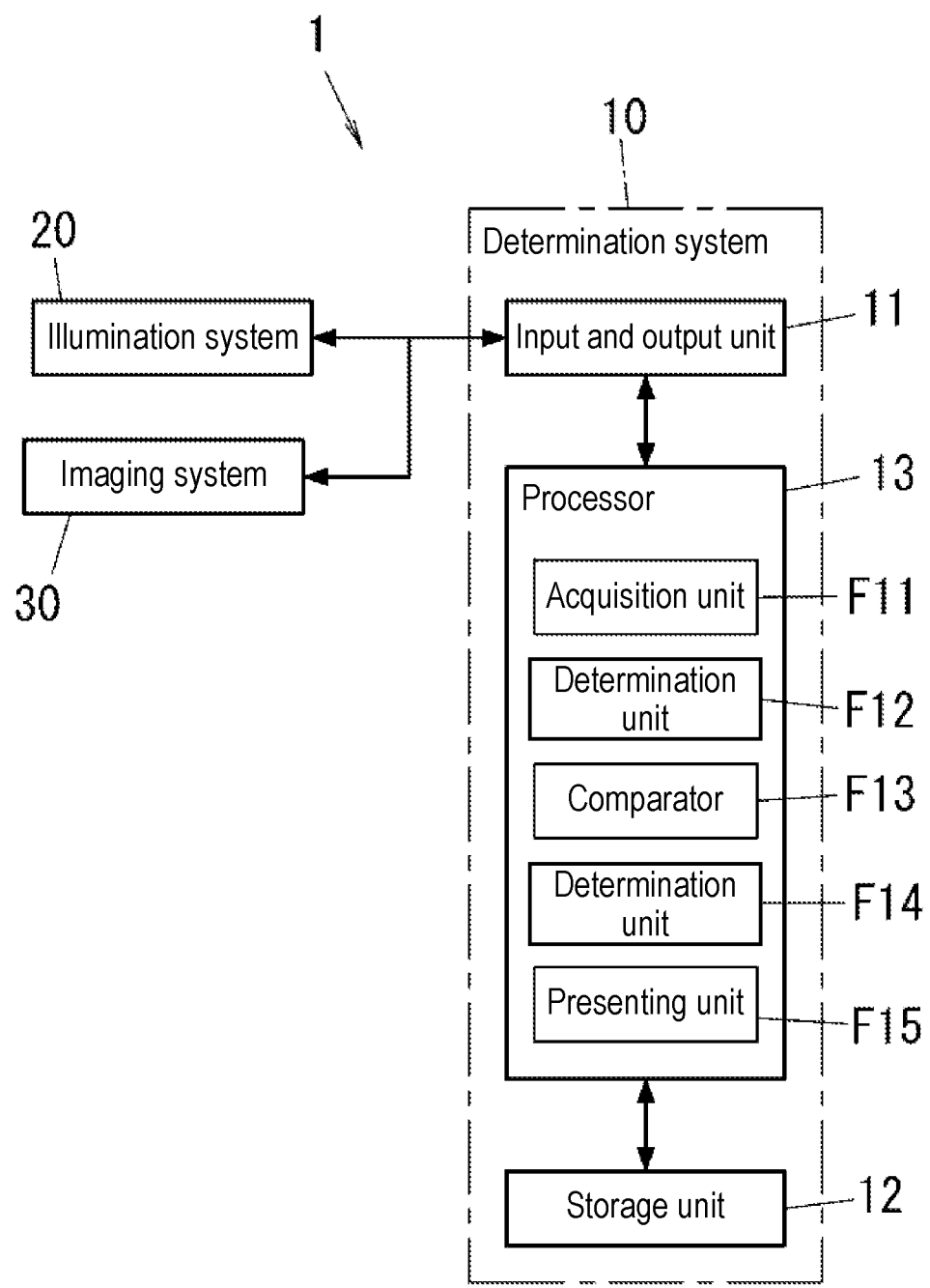
FIG. 2 is a block diagram of an inspection system that performs the inspection method.
Figure 3:
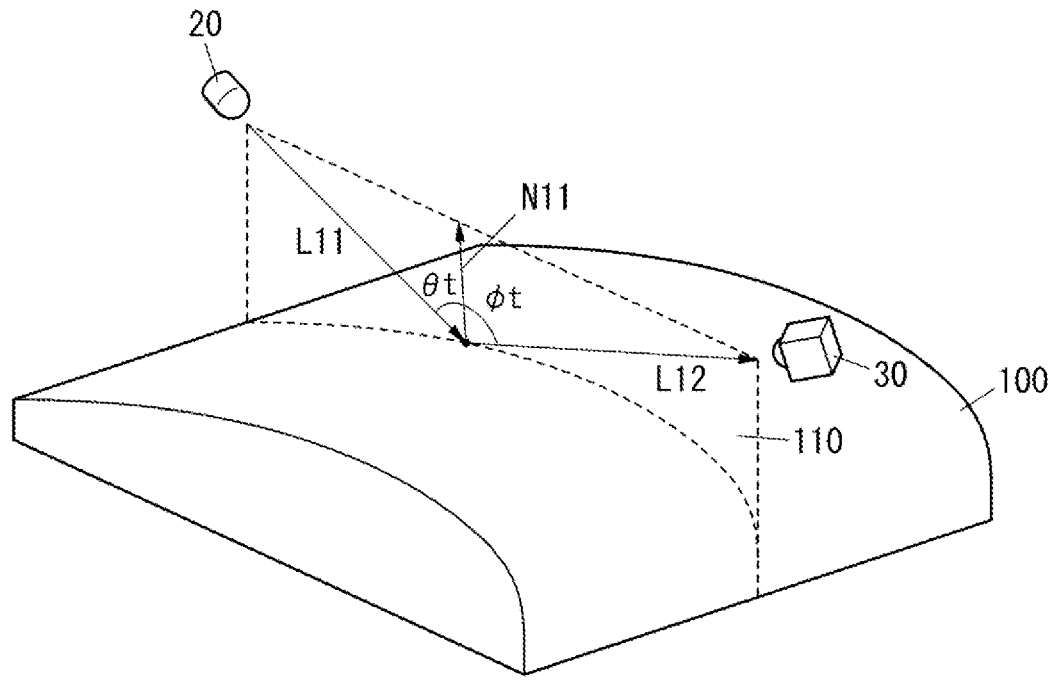
FIG. 3 is an explanatory diagram of a positional relationship between an object and an illumination system of the inspection system and between the object and an imaging system of the inspection system.

FIG. 1 is a flowchart of an inspection method according to one exemplary embodiment. FIG. 2 illustrates inspection system 1 that performs the inspection method. The inspection method is a method for inspecting a surface of object 100 as illustrated in FIG. 3. More specifically, the inspection method is a method for inspecting the color of the surface of object 100. FIG. 3 illustrates a part of object 100 to simplify the illustration.

The inspection method includes acquisition step S11 and comparison step S15, S16.

As illustrated in FIG. 3, acquisition step S11 is a step of acquiring target image P10 (see FIG. 5) of the surface of object 100 obtained by imaging system 30 imaging the surface of object 100 illuminated by illumination system 20. Comparison step S15, S16 is a step of comparing the color of attention region P101 (see FIG. 5) on target image P10 with the color of reference region P201 (see FIG. 6). Reference region P201 is a region of reference image P20 (see FIG. 6) of the surface of reference object 200 as a reference of the color of object 100. Further, reference region P201 is a region corresponding to a combination of incident angle θt of light L11 from illumination system 20 and reflection angle φt of light L12 to imaging system 30 in attention region P101.

In the inspection method, when the color of object 100 is compared with the color of reference object 200, colors are compared between attention region P101 of object 100 and reference region P201 of reference object 200. Reference region P201 is a region corresponding to a combination of incident angle θt of light from illumination system 20 and reflection angle φt of light to imaging system 30 in attention region P101. That is, in the inspection method, the colors of object 100 and reference object 200 are not simply compared. In the inspection method, the color of attention region P101 is compared with the color of reference region P201 corresponding to a combination of incident angle θr and reflection angle φr (see FIG. 4) corresponding to the combination of incident angle θt and reflection angle φt in attention region P101. In such a way, the color of attention region P101 is compared with the color of reference region P201 using the incident angle of the light from illumination system 20 and the reflection angle of the light to imaging system 30 as keys. As a result, the colors can be compared between attention region P101 and reference region P201 in which the combinations of the incident angle of the light from illumination system 20 and the reflection angle of the light to imaging system 30 correspond to each other. As a result, the colors can be compared between attention region P101 and reference region P201 in which optical characteristics (reflection characteristics) of the surfaces match. It is considered that the optical characteristics of the surfaces reflect the shapes of the surfaces. Therefore, in inspection of the color of object 100, it is possible to reduce the influence of a difference in shape between object 100 and reference object 200. As a result, the inspection method according to the present exemplary embodiment can improve the accuracy of inspecting the color of the surface of object 100.

(1.2) Details

Hereinafter, inspection system 1 that performs the inspection method according to the present exemplary embodiment will be described in more detail with reference to the drawings. Inspection system 1 is a system configured to inspect object 100. Inspection system 1 has a function as a coloring inspection apparatus. In the present exemplary embodiment, an inspection by inspection system 1 is performed on a color of the surface of object 100.

Object 100 may be any object having a surface. In the present exemplary embodiment, the surface of object 100 includes a curved surface. As an example, object 100 may be an automobile. In particular, the surface of object 100 is part of the outer surface of a vehicle body of the automobile. Note that object 100 is not limited to an automobile. For example, object 100 may be a moving body other than an automobile or may not be a moving body. Examples of the moving body include a two-wheeled vehicle, a train, a drone, an aircraft, a construction machine, and a ship. Further, object 100 may be an electric device, a dish, a container, furniture, clothing, a building material, or the like. In short, object 100 may be any object having a surface. In particular, inspection system 1 according to the present exemplary embodiment can be suitably used for object 100 that is to be painted.

Figure 4:
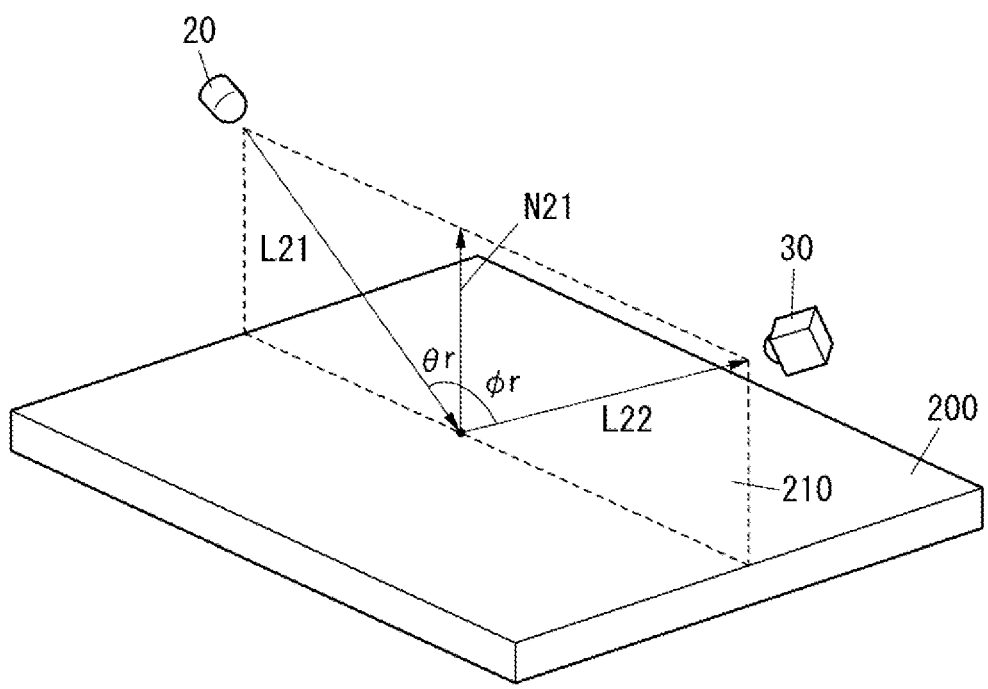
FIG. 4 is an explanatory diagram of a positional relationship between a reference object and the illumination system of the inspection system and between the reference object and the imaging system of the inspection system.

As illustrated in FIG. 2, inspection system 1 includes determination system 10, illumination system 20, and imaging system 30. Note that FIGS. 3 and 4 illustrate illumination system 20 and imaging system 30 in a schematic manner.

Illumination system 20 is a system for emitting light to the surface of object 100. Illumination system 20 includes at least one lamp for emitting light to object 100. An example of the lamp is a light emitting diode (LED) lamp. Further, the lamp emits white light. Note that, in illumination system 20, the number of lamps is not particularly limited, and the type of lamp may be a light source other than the LED. Further, the emission color of the lamp is not limited to white. The emission color of the lamp can be appropriately set in consideration of a color of object 100 and a color detectable by imaging system 30. Further, the wavelength of light emitted by illumination system 20 may be changeable.

Imaging system 30 is a system for generating an image (digital image) of the surface of object 100. In the present exemplary embodiment, imaging system 30 images the surface of object 100 illuminated by illumination system 20 to generate an image of the surface of object 100. Imaging system 30 includes at least one camera. The camera includes at least one image sensor. Note that the camera may include at least one line sensor.

As illustrated in FIG. 2, determination system 10 includes input and output part 11, storage part 12, and processor 13. Determination system 10 can be achieved by a computer system. The computer system may include at least one processor, at least one connector, at least one communicator, and at least one memory.

Input and output part 11 inputs and outputs information to and from illumination system 20 and imaging system 30. In the present exemplary embodiment, input and output part 11 is communicably connected to illumination system 20 and imaging system 30.

Input and output part 11 includes at least one input and output device and uses at least one input and output interface.

Storage part 12 is used to store information to be used by processor 13. Storage part 12 includes at least one storage device. Examples of the storage device are a random access memory (RAM) and an electrically erasable programmable read only memory (EEPROM).

Storage part 12 stores reference data. The reference data is data related to reference object 200 (see FIG. 4) as a reference of the color of object 100. In the present exemplary embodiment, the surface of object 100 is painted in a single color, and the surface of reference object 200 is painted in a single color. As an example, the reference data can be generated from reference image P20 (see FIG. 6) that is an image of reference object 200 captured under a predetermined imaging condition. The imaging conditions may include a relative positional relationship among reference object 200, illumination system 20, and imaging system 30 (that is, information about a positional relationship among the imaging object, the illumination, and the camera). The reference data includes incident angle θr, reflection angle φt, and a pixel value for each pixel of reference object 200. As illustrated in FIG. 4, incident angle θr is an angle of incidence of light L21 from illumination system 20 to a region of the surface of reference object 200 corresponding to a pixel. More specifically, on incident surface 210, incident angle θr is an angle formed by a direction of normal line N21 in the region, corresponding to the pixel, of the surface of reference object 200 and light L21 from illumination system 20. As illustrated in FIG. 4, reflection angle φr is an angle of reflection of light L22 from a region, corresponding to the pixel, of the surface of reference object 200 to imaging system 30. More specifically, on incident surface 210, reflection angle φr is an angle formed by the direction of normal line N21 in the region, corresponding to the pixel, of the surface of reference object 200 and light L22 to imaging system 30. Incident surface 210 includes, as one example, a center of illumination system 20 and a center of imaging system 30, and may be defined as a plane orthogonal to the surface of reference object 200. As for reference image P20 in FIG. 6, the center of illumination system 20 and the center of imaging system 30 are along an Y axis, and incident surface 210 is a plane orthogonal to an X axis. In the present exemplary embodiment, since the surface of reference object 200 is flat, normal line N21 may be considered to be perpendicular to the surface in each pixel. Incident angle θr and reflection angle φr are obtained from the relative positional relationship among reference object 200, illumination system 20, and imaging system 30. The pixel values may include three color values. The three colors values may be an R value corresponding to red, a G value corresponding to green, and a B value corresponding to blue.

In such a way, in the present exemplary embodiment, the pixel values are represented by an RGB color system.

An example of the reference data is listed in Table 1 below. In Table 1, X and Y represent coordinates of pixels. Hereinafter, a pixel in which the value of X is a and the value of Y is b is occasionally described as a pixel (a, b). Note that reference image P20 has a size of 1024×1024 as an example, but has a size of 16×16 in FIG. 6 for simplification of illustration.

TABLE 1

| Pixel | | Incident | Reflection | Pixel value | | |
|---|---|---|---|---|---|---|
| X | Y | angle θr | angle φr | R value | G value | B value |
| 1 | 1 | −5 | 82 | 92 | 25 | 12 |
| . | . | . | . | . | . | . |
| . | . | . | . | . | . | . |
| . | . | . | . | . | . | . |
| 50 | 140 | 12 | 78 | 197 | 71 | 28 |
| 50 | 141 | 15 | 75 | 225 | 75 | 35 |
| 50 | 142 | 17 | 73 | 777 | 79 | 38 |
| . | . | . | . | . | . | . |
| . | . | . | . | . | . | . |
| 51 | 140 | 15 | 78 | 198 | 71 | 29 |
| . | . | . | . | . | . | . |
| . | . | . | . | . | . | . |
| 1024 | 1024 | 70 | 3 | 87 | 22 | 11 |

Processor 13 can be achieved by, for example, at least one processor (microprocessor). That is, at least one processor executes at least one program (computer program) stored in at least one memory to function as processor 13. The at least one program may be recorded in the at least one memory in advance or may be provided through an electric telecommunication line such as the Internet. In another manner, the at least one program may be recorded in a non-transitory recording medium such as a memory card to be provided.

As illustrated in FIG. 2, processor 13 includes acquisition part F11, determination part F12, comparator F13, determination part 14, and presenting part 15. Acquisition part F11, determination part F12, comparator F13, determination part F14, and presenting part F15 are not tangible components, but are functions achieved by processor 13.

Acquisition part F11 executes an acquisition step of acquiring target image P10 (FIG. 5) of the surface of object 100 obtained by imaging system 30 imaging the surface of object 100 illuminated by illumination system 20.

In the present exemplary embodiment, acquisition part F11 acquires an image of the surface of object 100 from imaging system 30. That is, acquisition part F11 receives the image from imaging system 30 via input and output part 11. The image acquired by acquisition part F11 from imaging system 30 is determined by an imaging condition of imaging system 30. The imaging condition may include a relative positional relationship among object 100, illumination system 20, and imaging system 30 (that is, information about a positional relationship among the imaging object, the illumination, and the camera).

Determination part F12 executes a determination step of determining incident angle θt and reflection angle φt in attention region P101. In the determination step, incident angle θt and reflection angle φt in attention region P101 are calculated using at least one image of object 100. More specifically, determination part F12 generates target data to be used for color inspection of object 100, based on target image P10 acquired by acquisition part F11. The target data includes incident angle θt, reflection angle φt, and a pixel value for each pixel of object 100. As illustrated in FIG. 3, incident angle θt is an angle of incidence of light L11 from illumination system 20 to a region of the surface of object 100 corresponding to a pixel. More specifically, on incident surface 110, incident angle θt is an angle formed by a direction of normal line N11 in the region, corresponding to the pixel, of the surface of object 100 and light L11 from illumination system 20. As illustrated in FIG. 3, reflection angle φt is an angle of reflection of light L12 from the region, corresponding to the pixel, of the surface of object 100 to imaging system 30. More specifically, on incident surface 110, reflection angle φt is an angle formed by the direction of normal line N11 in the region, corresponding to the pixel, of the surface of object 100 and light L12 to imaging system 30. Incident surface 110 includes, as one example, a center of illumination system 20 and a center of imaging system 30, and may be defined as a plane orthogonal to the surface of object 100. As for target image P10 in FIG. 5, the center of illumination system 20 and the center of imaging system 30 are along an Y axis, and incident surface 110 is a plane orthogonal to an X axis. Determination part F12 uses normal line N11 of each pixel of the target image P10 in order to obtain incident angle θt and reflection angle φt. Determination part F12 has a function of obtaining normal line N11.

Figure 7:
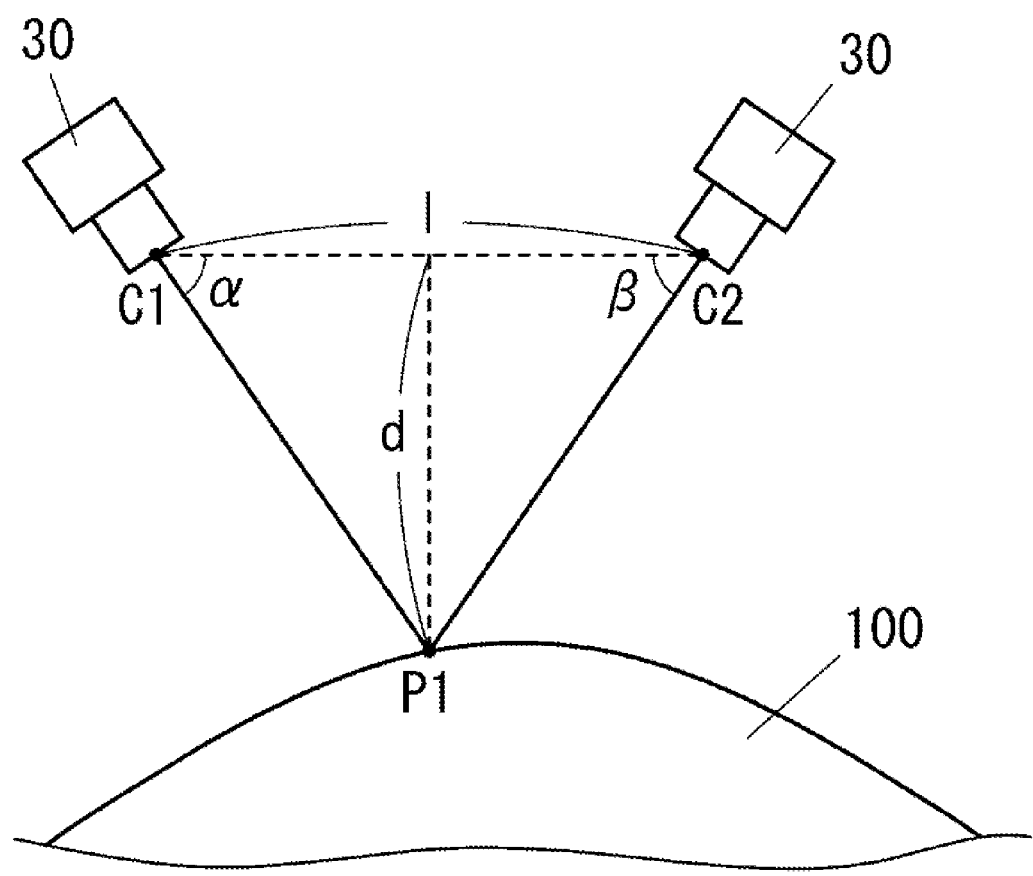
FIG. 7 is an explanatory diagram of a method for determining a normal direction of a surface of the object.

Normal line N11 can be obtained from the shape of the surface of object 100. In the present exemplary embodiment, the surface of object 100 is a curved surface as illustrated in FIG. 3, and the direction of normal line N11 differs depending on a location of the surface of object 100. In the present exemplary embodiment, triangulation is used to estimate the shape of the surface of object 100. For example, as illustrated in FIG. 7, distance d to measurement target portion P1 on the surface of object 100 is obtained by using triangulation. In FIG. 7, symbol 1 indicates a distance of a straight line connecting imaging points C1 and C2 of imaging systems 30. Symbol a indicates an angle between a straight line connecting imaging point C1 and measurement target portion P1 and a straight line connecting imaging points C1 and C2. Symbol β indicates an angle between a straight line connecting imaging point C2 and measurement target portion P1 and the straight line connecting imaging points C1 and C2. In this case, distance d is represented by $1/(1/\tan\alpha + 1/\tan\beta)$. Therefore, if distance 1, angle α, and angle β are determined, distance d can be obtained. Then, the shape of the surface of object 100 can be obtained by obtaining distance d with each portion of the surface of object 100 being as measurement target portion P1. When the shape of the surface of object 100 is obtained, normal line N11 of each portion of the surface of object 100 is obtained. Therefore, determination part F12 can acquire normal line N11 using triangulation.

Figure 5:
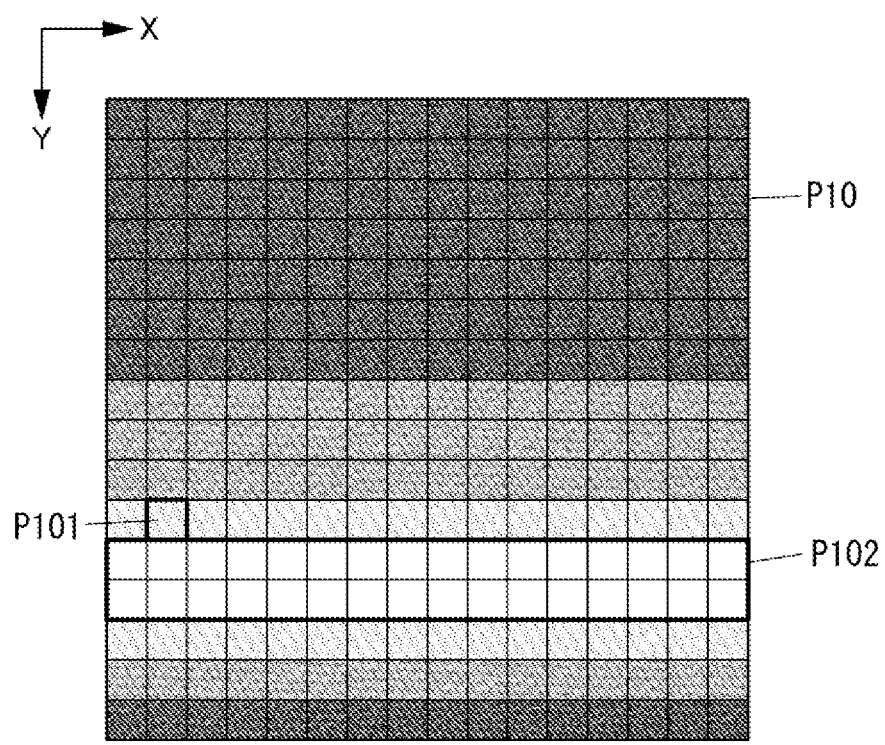
FIG. 5 is a diagram illustrating an example of an image of an object (target image) captured by the inspection system.
Figure 6:
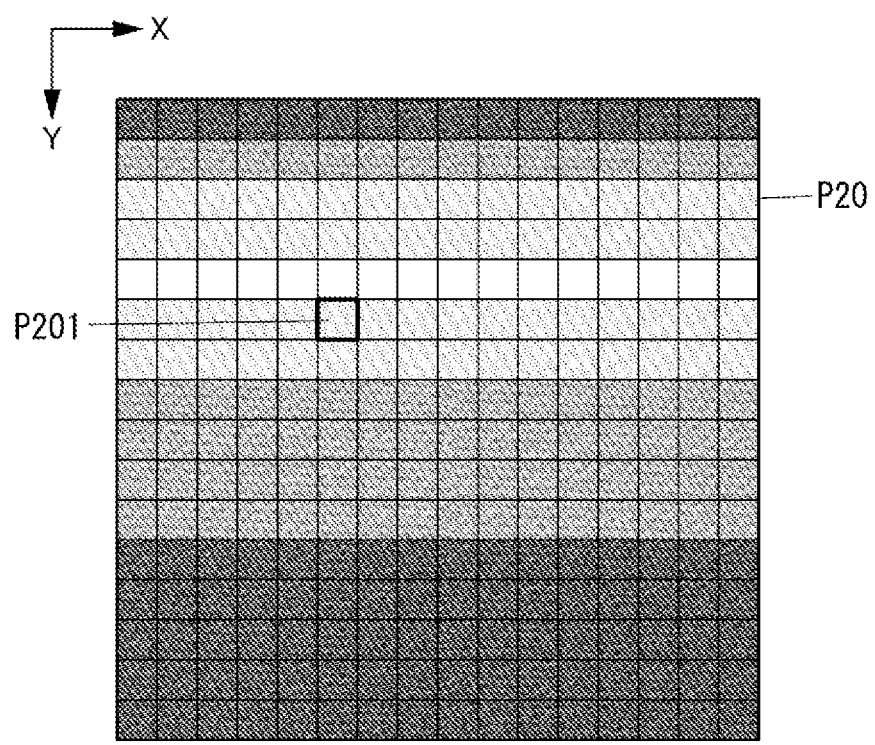
FIG. 6 is a diagram illustrating an example of an image of a reference object (reference image) captured by the inspection system.

Here, determination part F12 sets a brightest region on target image P10 as standard region P102 (see FIG. 5). Standard region P102 is considered to be a region where regular reflection occurs, and incident angle θt and reflection angle φt are considered to be equal to each other. Therefore, determination part F12 determines normal line N11 for each pixel of target image P10 with reference to the shape of the surface of object 100 using normal line N11 in standard region P102 as a reference.

In the triangulation, object 100 may be simultaneously imaged at imaging points C1 and C2 using two imaging systems 30. Alternatively, object 100 may be imaged sequentially at imaging points C1 and C2 using one imaging system 30.

Determination part F12 then obtains incident angle θt and reflection angle φt based on the relative positional relationship among object 100, illumination system 20, and imaging system 30 and the direction of normal line N11. Note that the pixel values may include three color values similarly to the reference data. The three colors values may be an R value corresponding to red, a G value corresponding to green, and a B value corresponding to blue.

An example of the target data is listed in Table 2 below. In Table 2, symbols X and Y represent coordinates of pixels. Hereinafter, a pixel in which the value of X is a and the value of Y is b is occasionally described as a pixel (a, b). Note that target image P10 has a size of 1024×1024 as one example, but has a size of 16×16 in FIG. 5 for simplification of illustration.

TABLE 2

| Pixel | | Incident | Reflection | Pixel value | | |
|---|---|---|---|---|---|---|
| X | Y | angle θt | angle φt | R value | G value | B value |
| 1 | 1 | — | — | — | — | — |
| . | . | . | . | . | . | . |
| . | . | . | . | . | . | . |
| . | . | . | . | . | . | . |
| 500 | 320 | 10 | 80 | 186 | 62 | 27 |
| 500 | 321 | 15 | 75 | 224 | 77 | 32 |
| 500 | 322 | 22 | 69 | 226 | 83 | 36 |
| . | . | . | . | . | . | . |
| . | . | . | . | . | . | . |
| 501 | 320 | 9 | 80 | 154 | 33 | 16 |
| . | . | . | . | . | . | . |
| . | . | . | . | . | . | . |
| 1024 | 1024 | — | — | — | — | — |

Comparator F13 executes the comparison step of comparing a color of attention region P101 of target image P10 with a color of reference region P201. Reference region P201 is a region on reference image P20 and corresponds to a combination of incident angle θt of light L11 from illumination system 20 in attention region P101 and reflection angle φt of light L12 to imaging system 30.

In the present exemplary embodiment, attention region P101 is a single pixel. Comparator F13 uses a pixel (target pixel) corresponding to object 100 among the pixels of target image P10 as attention region P101. That is, comparator F13 does not compare colors of pixels that are not related to object 100 even on the pixels of target image P10. In an example of Table 2, the pixel (1, 1) and the pixel (1024, 1024) are not related to object 100, and the combination of incident angle θt and reflection angle φt is not obtained. Therefore, the pixel (1, 1) and the pixel (1024, 1024) are not target pixels. In this manner, comparator F13 compares the colors of target image P10 and reference image P20 for each target pixel of target image P10. Here, a pixel value is used for color comparison.

When comparing colors, comparator F13 determines reference region P201 that is subject to comparison of a color of attention region P101. Reference region P201 is a region corresponding to the combination of incident angle θt and reflection angle φt in attention region P101 on reference image P20. In the present exemplary embodiment, reference region P201 is a region on reference image P20 in which the combination of the incident angle and the reflection angle coincides with the combination in attention region P101. For example, in Table 2, when a pixel (500, 321) is attention region P101, the combination of incident angle θt and reflection angle φt is (15, 75). In this case, reference region P201 is a pixel in which the combination of incident angle θr and reflection angle φr is (15, 75). In Table 1, in a pixel (50, 141), since the combination of incident angle θr and reflection angle φr is (15, 75), the pixel (50, 141) is selected as reference region P201. Comparator F13 then compares pixel values (R value, G value, and B value) in attention region P101 and reference region P201, and obtains an error of the pixel values as a result of the comparison. As an example, comparator F13 compares pixel values (224, 77, 32) of the pixel (500, 321) that is attention region P101 with pixel values (225, 75, 35) of the pixel (50, 141) that is reference region P201. In this case, the error of the pixel values that is the comparison result is represented by values (−1, 2, −3) obtained by subtracting the pixel values (225, 75, 35) of reference region P201 from the pixel values (224, 77, 32) of attention region P101.

Determination part F14 executes color determination processing. The color determination processing is processing for determining the color of the surface of object 100. More specifically, the color determination processing is processing for determining the color of the surface of object 100 based on the comparison result in comparator F13. Note that the color of the surface of object 100 is determined in a part of attention region P101. Determination part F14 determines based on the comparison result in comparator F13 that the color of attention region P101 is acceptable when the matching rate (matching degree) between the color of attention region P101 and the color of reference region P201 is greater than or equal to a specific value. On the other hand, when the matching degree between the color of attention region P101 and the color of reference region P201 is less than the specific value, determination part F14 determines that the color of attention region P101 is unacceptable.

As an example, the specific value may be determined using visual evaluation. A method for determining the specific value using visual evaluation will be briefly described. For example, a plurality of samples d1 to dn having different coating conditions are prepared as object 100. Note that symbol n is any integer of two or more. As an example, the coating condition may be set such that the color becomes lighter in the order of samples d1 to dn.

Figure 8:
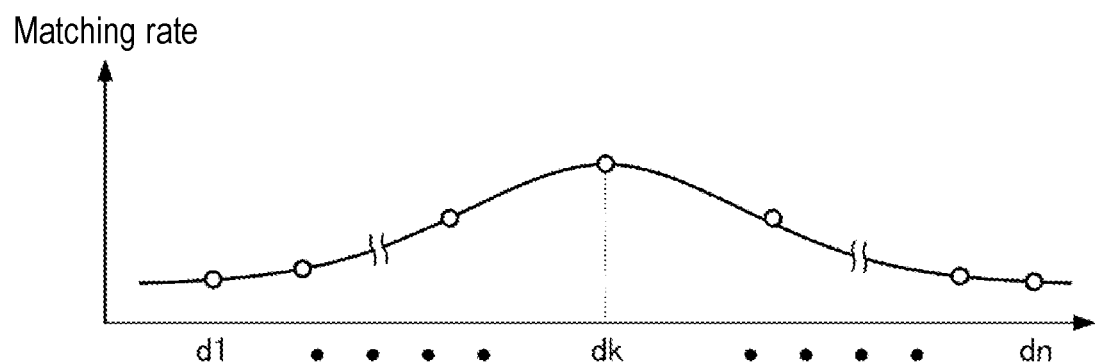
FIG. 8 is a graph illustrating a matching rate between a plurality of samples prepared as objects and a reference object.
Figure 9:
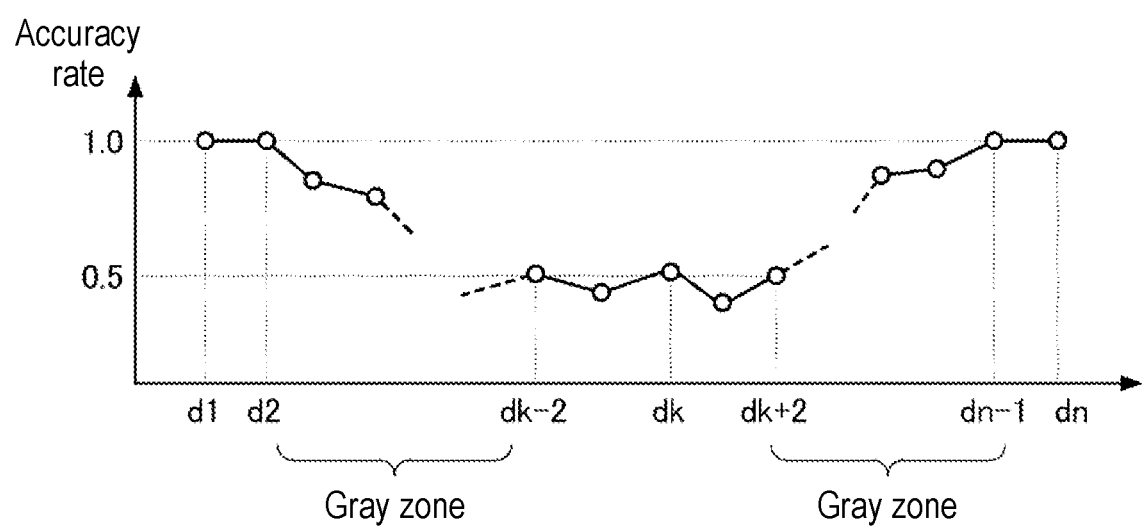
FIG. 9 is a graph illustrating a result of visual evaluation of the plurality of samples prepared as objects.

Each of the plurality of samples d1 to dn is compared with reference object 200 as for regions having identical combinations of the incident angle and the reflection angle to obtain a matching rate. FIG. 8 illustrates a relationship between samples d1 to dn and the matching rate. In FIG. 8, the matching rate is highest between sample dk and reference object 200. Then, each of samples d1 to dn is visually evaluated by a plurality of persons (as an example, 30 persons) to obtain an accuracy rate. In the visual evaluation, one of samples d1 to dn is compared with sample dk. The accuracy rate is a ratio between the number of persons who have made the visual evaluation and the number of persons who have selected sample dk. FIG. 9 illustrates results of the visual evaluation. Samples having the accuracy rate of 1.0 may be obviously determined as inacceptable. As for samples with the accuracy rate of 0.5, the accuracy rate is equivalent to being random, thus the samples may be regarded as acceptable. Then, as for samples d2 to dk−2 and dk+2 to dn−1 whose accuracy rates are between 0.5 to 1.0, inclusive, a determination is further made which of the samples to be included in an allowable range.

Figure 10:
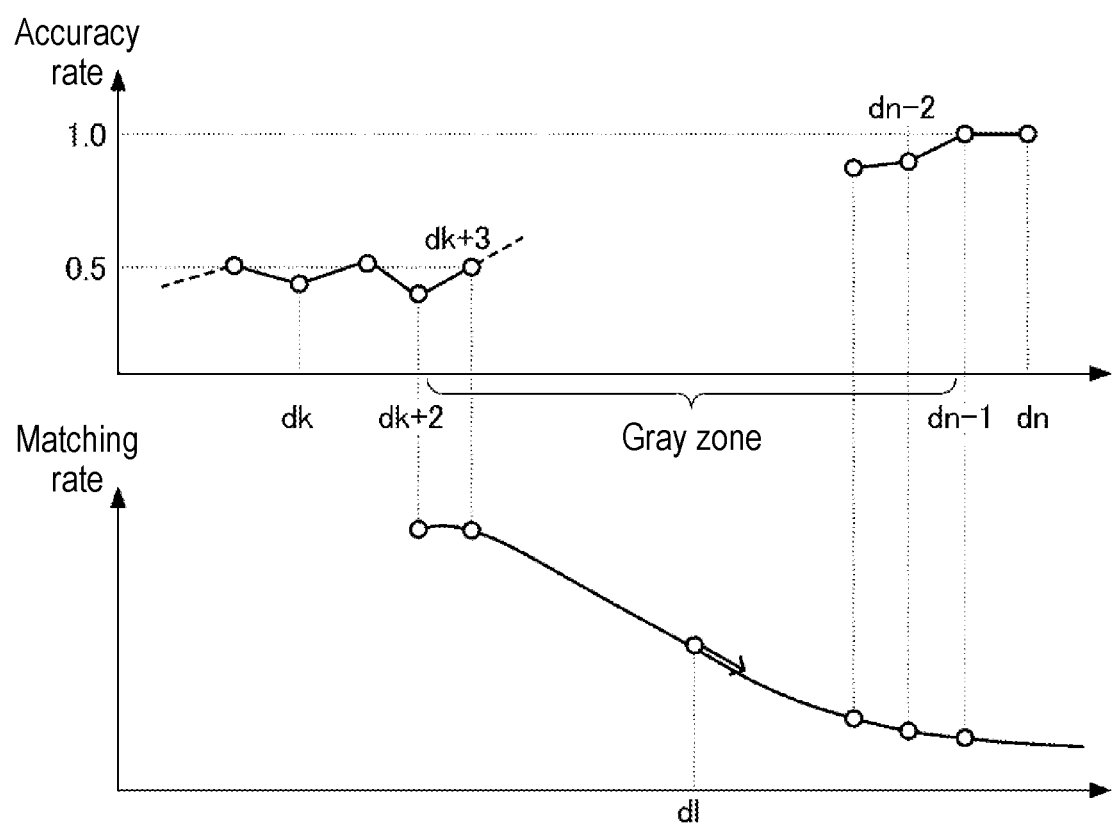
FIG. 10 is a graph illustrating a relationship between the matching rate and the visual evaluation of the plurality of samples prepared as objects.

For example, as illustrated in FIG. 10, among samples dk+2 to dn−1, sample dl having a large gradient (inclination) of a matching rate and sample dk+2 that is acceptable are visually evaluated. Here, if the accuracy rate is 1.0, sample dl is determined as inacceptable. Then, sample dl−1 having the highest matching rate next after sample dl and sample dl are visually evaluated. If the accuracy rate is 1.0, sample dl−1 is determined as inacceptable. Then, sample dl−2 having the highest matching rate next after sample dl−1 and sample dl−1 are visually evaluated. If the accuracy rate is 0.5, sample dl−1 is determined as being within a limit of the allowable range. In this way, the visual evaluation is repeated until the accuracy rate reaches 0.5, and the sample with the accuracy rate of 0.5 is set as the sample within the limit of the allowable range. However, when the visual evaluation proceeds to sample dk+2 before the accuracy rate becomes 0.5, sample dk+2 is regarded as a sample within the limit of the allowable range. The visual evaluation is then ended.

On the other hand, when the accuracy rate is 0.5 in the visual evaluation of sample dl and acceptable sample dk+2, sample dl is regarded as acceptable. Then, sample dl+1 having a matching rate lower next after sample dl and sample dl are visually evaluated. If the accuracy rate is 0.5, sample dl+1 is regarded as acceptable. Then, sample dl+2 having a matching rate lower next after sample dl+1 and sample dl+1 are visually evaluated. If the accuracy rate is 1.0, sample dl+1 is regarded as being within the limit of the allowable range. In such a manner, the visual evaluation is repeated until the accuracy rate reaches 1.0, and the sample with the accuracy rate of 1.0 is set as the sample within the limit of the allowable range. However, when the visual inspection proceeds to sample dn−1 before the accuracy rate becomes 1.0, sample dn−2 one before sample dn−1 is regarded as the sample within the limit of the allowable range. The visual evaluation is then ended.

Then, as to samples d2 to dk−2, samples within the limit of the allowable range may be determined in the similar manner. The specific value is determined based on the matching rate of the sample that is selected from samples d2 to dk−2 and is within the limit of the allowable range and the matching rate of the sample that is selected from samples dk+2 to dn−1 and is within the limit of the allowable range. Examples of the specific value to be used may include any higher one, any lower one, or an average value of the matching rate of the sample that is selected from samples d2 to dk−2 and is within the limit of the allowable range and the matching rate of the sample that is selected from samples dk+2 to dn−1 and is within the limit of the allowable range.

Presenting part F15 executes a result presenting step of performing presentation based on the result of the comparison in the comparison step. That is, presenting part F15 performs presentation based on the result of the comparison in comparator F13. The presentation based on the comparison result can also include presentation of the determination result in determination part F14 using the comparison result. Therefore, presenting part F15 may present the determination result in determination part F14. In the present exemplary embodiment, presenting part F15 outputs the determination result in determination part F14 to an external apparatus through input and output part 11. The external apparatus may present the determination result in determination part F14, that is, the inspection result in inspection system 1.

(1.3) Operation

Next, the inspection method performed by inspection system 1 described above will be briefly described with reference to a flowchart of FIG. 1. In inspection system 1, acquisition part F11 acquires target image P10 from imaging system 30 (S11). Next, determination part F12 obtains normal line N11 for each attention region P101 of target image P10 (S12), and further obtains incident angle θt and reflection angle φt in attention region P101 (S13 and S14). Comparator F13 determines reference region P201 that is subject to comparison of a color of attention region P101 (S15). Herein, comparator F13 determines, as reference region P201, a region corresponding to a combination of incident angle θt and reflection angle φt in attention region P101 on reference image P20. Comparator F13 then compares pixel values (R value, G value, and B value) in attention region P101 and reference region P201, and obtains an error of the pixel values as a comparison result (S16). Determination part F14 determines the color of attention region P101 based on the result of the comparison in comparator F13, and presenting part F15 presents a determination result in determination part F14 (S17).

(1.4) Conclusion

Inspection system 1 described above includes acquisition part F11 and comparator F13. Acquisition part F11 acquires target image P10 of the surface of object 100 obtained by imaging system 30 imaging the surface of object 100 illuminated by illumination system 20. Comparator F13 compares the color of attention region P101 on target image P10 with the color of reference region P201. Reference region P201 is a region of reference image P20 of the surface of reference object 200 as a reference of the color of object 100. Further, reference region P201 is a region corresponding to the combination of incident angle θt of light L11 from illumination system 20 in attention region P101 and reflection angle φt of light L12 to imaging system 30. As a result, inspection system 1 can improve the accuracy of inspecting the color of the surface of object 100.

In other words, inspection system 1 executes the following method (inspection method). The inspection method includes acquisition step S11 and comparison step S15, S16. Acquisition step S11 is a step of acquiring target image P10 of the surface of object 100 obtained by imaging system 30 imaging the surface of object 100 illuminated by illumination system 20. Comparison step S15, S16 is a step of comparing the color of attention region P101 on target image P10 with the color of reference region P201. Reference region P201 is a region of reference image P20 of the surface of reference object 200 as a reference of the color of object 100. Further, reference region P201 is a region corresponding to the combination of incident angle θt of light L11 from illumination system 20 in attention region P101 and reflection angle φt of light L12 to imaging system 30. Therefore, similarly to inspection system 1, the inspection method can improve the accuracy of inspecting the color of the surface of object 100.

The inspection method is achieved by at least one processor executing a program (computer program). This program is a program for causing at least one processor to execute the inspection method. Similarly to the inspection method, the program can improve the accuracy of inspecting the color of the surface of object 100. Then, the program can be provided by a storage medium. The storage medium is a computer-readable non-transitory storage medium that stores the program. Similarly to the inspection method, the storage medium can improve the accuracy of inspecting the color of the surface of object 100.

(2) Modifications

The exemplary embodiment of the present disclosure is not limited to the above exemplary embodiment. The above exemplary embodiment can be variously changed according to design and the like as long as the object of the present disclosure can be achieved. Modifications of the above exemplary embodiment will be described below.

In one modification, attention region P101 may be configured by a plurality of continuous pixels instead of a single pixel. In this case, the influence of a noise can be reduced. For example, attention region P101 may be a square region of m×n. At least one of integers m and n is 2 or more. In this case, incident angle θt, reflection angle φt, and the pixel values in attention region P101 may be representative values of incident angle θt, reflection angle φt, and the pixel values in the plurality of continuous pixels constituting attention region P101. The representative values each can be appropriately selected from a maximum value, a minimum value, an average value, a mode, and the like.

In one modification, a color system of the color (pixel value) of attention region P101 is not limited to the RGB color system. Examples of the color system include Commission Internationale de l'Eclairage (CIE) color systems such as an XYZ color system, an xyY color system, an L*u*v* color system, and an L*a*b* color system. As an example, imaging system 30 may generate an image in which pixel values are represented in the XYZ color system, instead of an image in which pixel values are represented in the RGB color system. Alternatively, the color system may be converted by arithmetic processing. For example, an image in which pixel values are represented in the RGB color system may be converted into an image in which pixel values are represented in the XYZ color system. For the arithmetic processing in this case, a model equation, a lookup table, or the like can be used. As a result, the pixel values of target image P10 can be represented in a desired color system.

In one modification, a colorimeter may be used. The colorimeter can only measure colors in a comparatively narrow range (for example, a range with a radius of less than 10 mm) at a time, and the measurable area at a time is small. When object 100 is a large object such as a vehicle, it is not realistic to measure the color of the entire surface of the object using the colorimeter. Therefore, it is conceivable to measure the color of the entire surface of the object using both the colorimeter and imaging system 30. In this case, first, the colorimeter measures a color of a specific portion of object 100 to obtain a colorimetric value (for example, a value of the L*a*b* color system). Next, the specific portion of object 100 is imaged by imaging system 30 to obtain an image, and this image is used as reference image P20. The pixel values of reference image P20 are directly associated with the measurement value of the colorimeter. Then, the entire surface of object 100 is sequentially imaged by imaging system 30, and the obtained images as target images P10 are compared with reference image P20 based on the combination of incident angle θr and reflection angle φr. In such a manner, the color inspection is performed. Here, for the region where a color difference is within the allowable range, if the inspection by the colorimeter is acceptable, that region may be similarly considered to be acceptable. That is, the pixel values of target image P10 are not directly associated with the measurement value of the colorimeter, but is compared with reference image P20 directly associated with the measurement value of the colorimeter. Therefore, it may be considered that the pixel values of target image P10 are indirectly evaluated by the colorimeter. Therefore, by using the colorimeter and imaging system 30 in combination, it is possible to easily expand a place (region), to be inspected, of object 100 while performing the inspection equivalent with the color inspection using only the colorimeter, and to shorten the inspection process. In particular, the above-described method using both the colorimeter and imaging system 30 is effective particularly for a case where color evaluation using a colorimeter designated in color inspection is required.

In the above exemplary embodiment, comparator F13 uses, as reference region P201, a region of reference image P20 in which the combination of incident angle θr and reflection angle φr matches the combination of incident angle θt and reflection angle φt in attention region P101. In some cases, however, reference image P20 does not include a region having the combination of incident angle θr and reflection angle φr that matches the combination of incident angle θt and reflection angle φt in attention region P101. Therefore, the reference data may be generated from a plurality of reference images P20 having different imaging conditions. This makes it possible to generate the reference data necessarily including the combination of incident angle θr and reflection angle φr that matches the combination of incident angle θt and reflection angle φt.

In one modification, comparator F13 may use, as reference region P201, a region of reference image P20 in which incident angle θr is an angle within a first angle range including incident angle θt in attention region P101 and reflection angle φr is an angle within a second angle range including reflection angle φt. As an example, the first angle range may be an angle range centered on incident angle θt in attention region P101. For example, the first angle range may range from θt−d1 to θt+d1, inclusive. Angle d1 may range from about 1° to 10°, inclusive. Further, the second angle range may be an angle range centered on reflection angle φt in attention region P101. For example, the second angle range may range from φt−d2 to φt+d2, inclusive. Angle d2 may range from about 1° to 10°, inclusive.

Target image P10 may include a plurality of attention regions P101 having identical combinations of incident angle θt and reflection angle φt. Further, reference image P20 may include a plurality of reference regions P201 having the same combination of incident angle θr and reflection angle φr. That is, the pair of attention region P101 and reference region P201 may not be uniquely determined with respect to the combination of incident angle θt and reflection angle φt. Therefore, comparator F13 may compare the colors of object 100 and reference object 200 using a statistical method.

As an example, comparator F13 may compare the colors of object 100 and reference object 200 using a histogram. In comparison step S15, S16 executed by comparator F13, color histograms of the plurality of attention regions P101 corresponding to a specific combination of the incident angle and the reflection angle may be compared with color histograms of the plurality of reference regions P201 of the reference image corresponding to the specific combination. Here, in the specific combination, incident angles θt, θr may be angles within the first angle range, and reflection angles φt, φr may be angles within the second angle range. The first angle range and the second angle range may be appropriately set.

Figure 11:
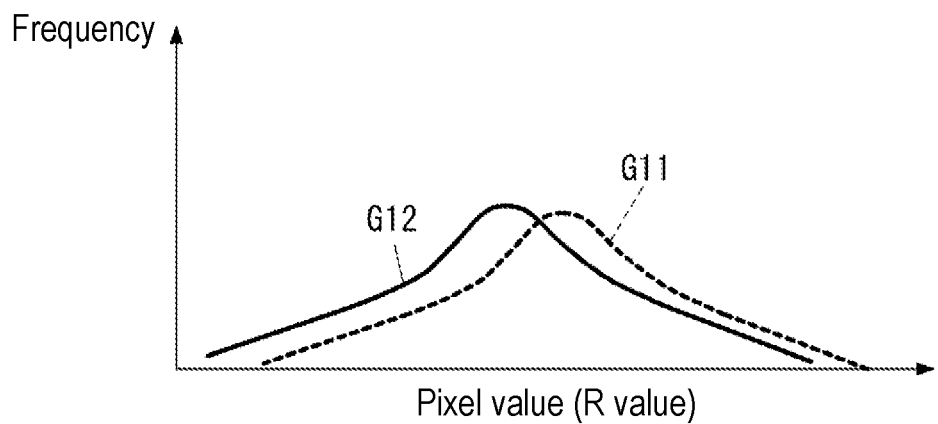
FIG. 11 is a graph illustrating histograms of pixel values (R values) of an attention region and a reference region.
Figure 12:
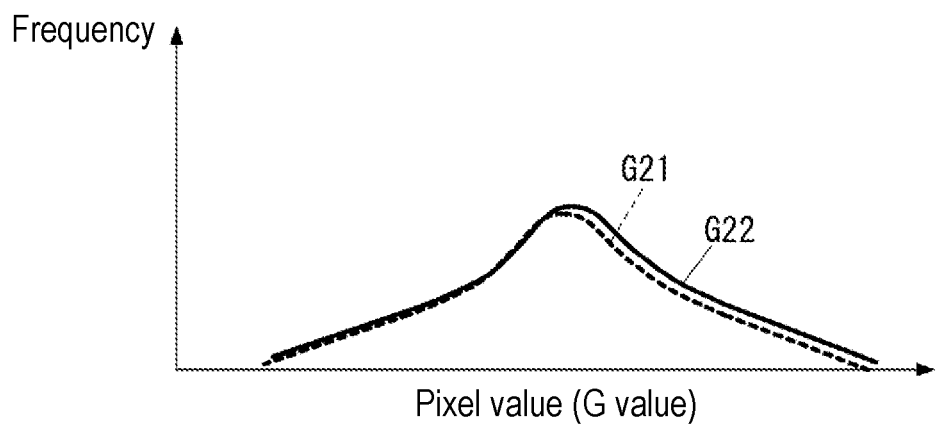
FIG. 12 is a graph illustrating histograms of pixel values (G values) of the attention region and the reference region.
Figure 13:
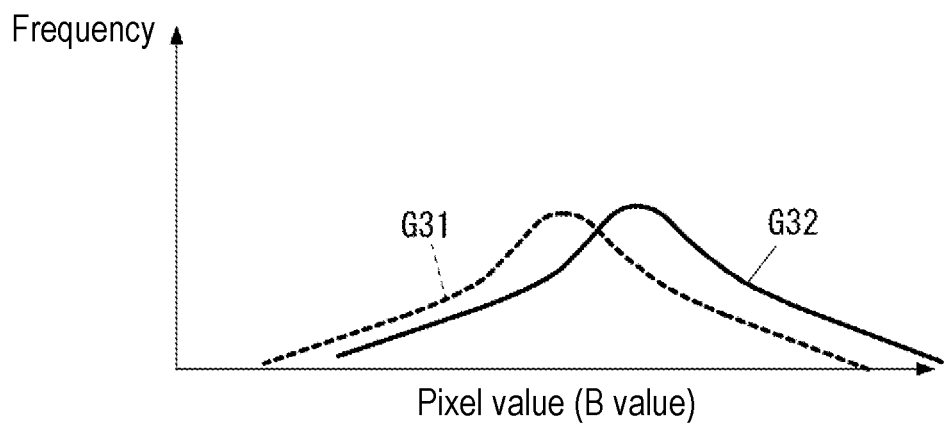
FIG. 13 is a graph illustrating histograms of pixel values (B values) of the attention region and the reference region.

Here, the pixel values include the R value, the G value, and the B value. Therefore, comparator F13 generates histograms of attention region P101 and reference region P201 for each of the R value, the G value, and the B value. For example, FIG. 11 illustrates histograms of R values where G11 indicates the histogram of attention region P101, and G12 indicates the histogram of reference region P201. FIG. 12 illustrates histograms of G values where G21 indicates the histogram of attention region P101, and G22 indicates the histogram of reference region P201. FIG. 13 illustrates histograms of B values where G31 indicates the histogram of attention region P101, and G32 indicates the histogram of reference region P201. Comparator F13 may compare the histogram of attention region P101 with the histogram of reference region P201 for each of the R value, the G value, and the B value to evaluate the matching rate. Determination part F14 can inspect the colors of object 100 and reference object 200 based on the matching rate of the histograms of the R value, the G value, and the B value.

Figure 14:
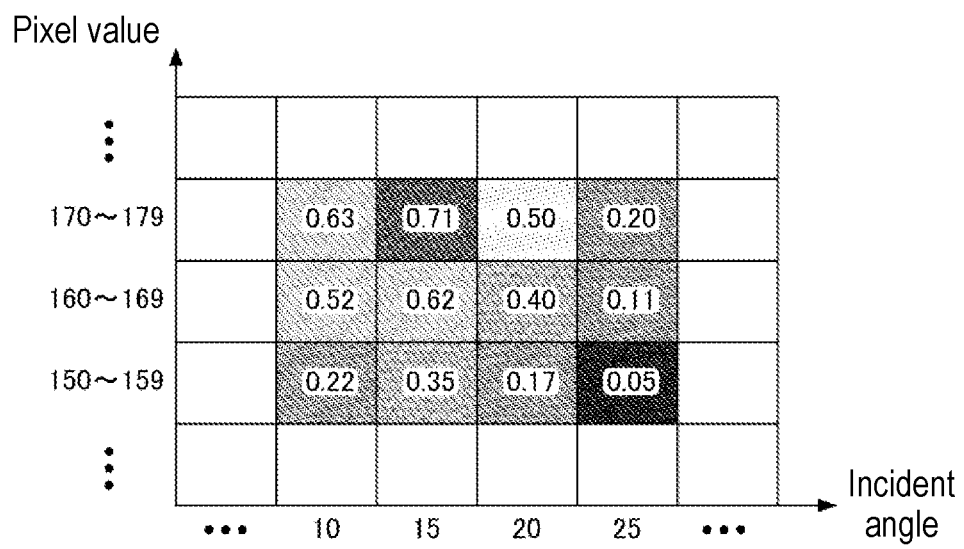
FIG. 14 is a diagram illustrating an example of a heat map of the target image.
Figure 15:
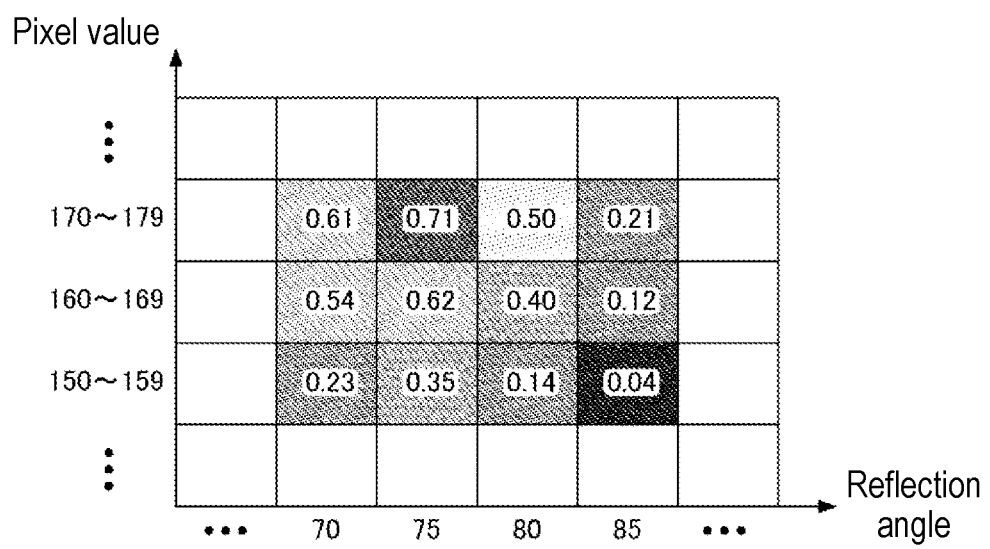
FIG. 15 is a diagram illustrating another example of the heat map of the target image.
Figure 16:
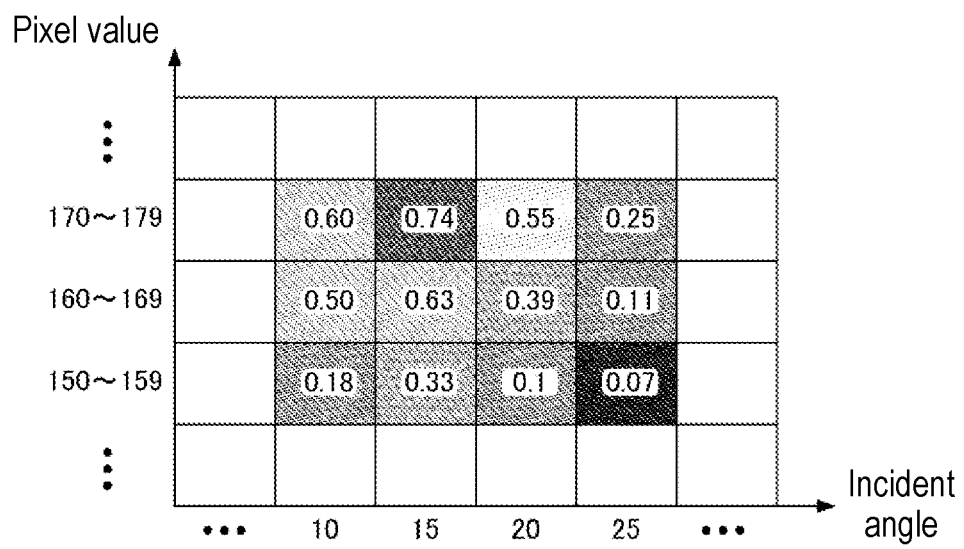
FIG. 16 is a diagram illustrating another example of the heat map of the target image.
Figure 17:
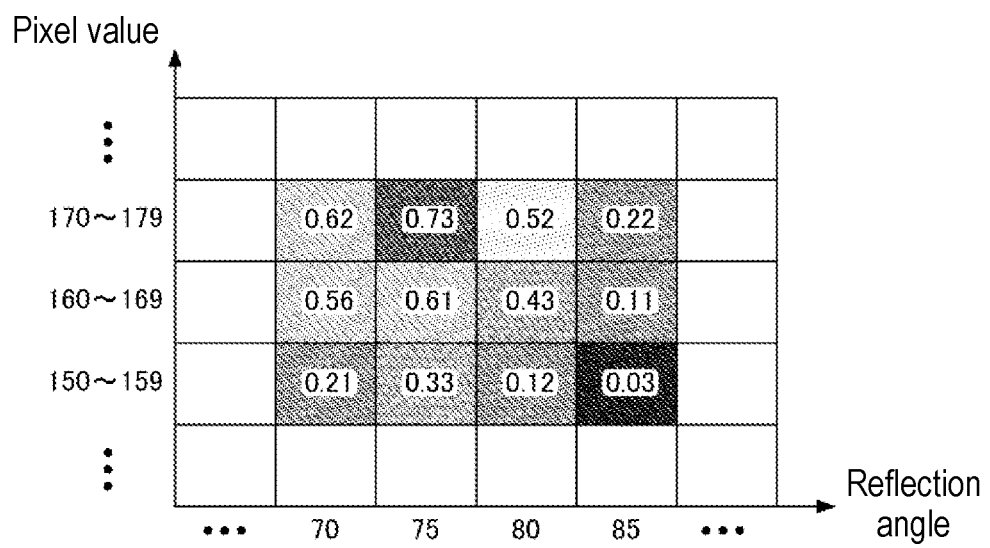
FIG. 17 is a diagram illustrating another example of the heat map of the target image.

Alternatively, comparator F13 may compare the colors of object 100 and reference object 200 using a heat map. As an example, in comparison step S15, S16 executed by comparator F13, a heat map for the incident angle and the pixel values and a heat map for the reflection angle and the pixel values are created for each of target image P10 and reference image P20. Here, the pixel values include the R value, the G value, and the B value. Therefore, for each of the incident angle and the reflection angle, heat maps corresponding to the R value, the G value, and the B value are created. That is, six types of heat maps are created from each of target image P10 and reference image P20. For example, FIG. 14 is a heat map of target image P10, and corresponds to incident angle θt and the pixel value (R value). FIG. 15 is a heat map of target image P10, and corresponds to reflection angle φt and the pixel value (R value). FIG. 16 is a heat map of reference image P20, and corresponds to incident angle θr and the pixel value (R value). FIG. 17 is a heat map of reference image P20, and corresponds to reflection angle φr and the pixel value (R value). Comparator F13 may compare the heat map of target image P10 with the heat map of reference image P20 to evaluate the matching rate. Determination part F14 can inspect the colors of object 100 and reference object 200 based on the matching rate of the heat map of target image P10 and the heat map of reference image P20.

Figure 18:
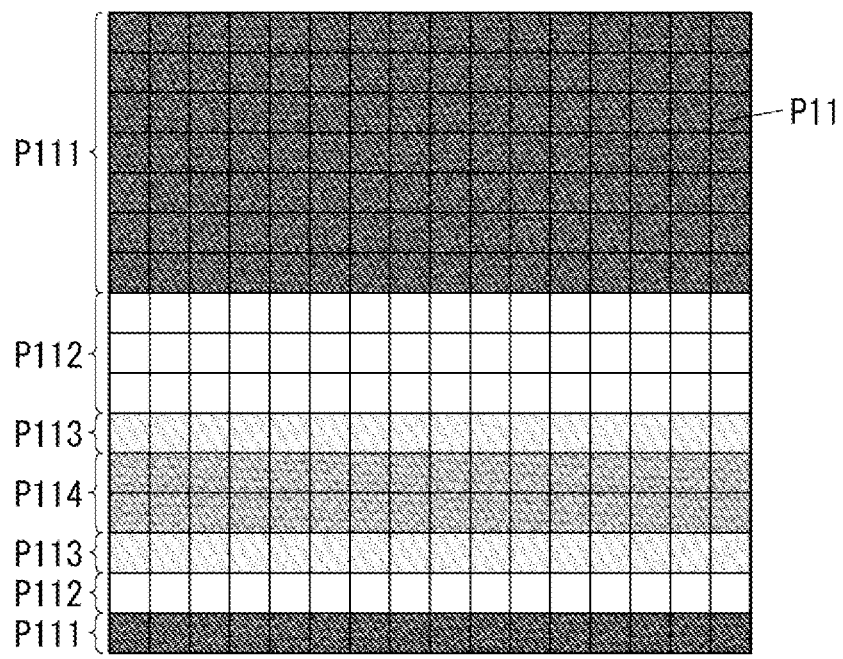
FIG. 18 is a diagram illustrating a target image in which regions having identical combinations of an incident angle and a reflection angle are color-coded.
Figure 19:
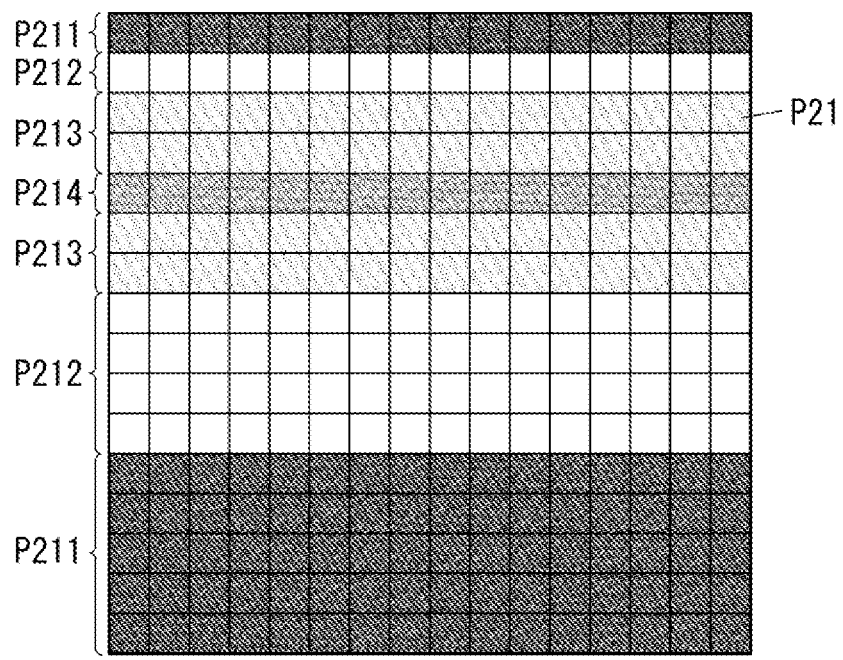
FIG. 19 is a diagram illustrating a reference image in which regions having identical combinations of the incident angle and the reflection angle are color-coded.

In one modification, presenting part F15 may perform the image presenting step of displaying regions having identical combinations of the incident angle and the reflection angle in the same mode on the target image and the reference image. Here, examples of the same mode include the same color, the same shading, and the same emphasis method. As an example, presenting part F15 may display regions having the identical combinations of the incident angle and the reflection angle in the same color on the target image and the reference image. That is, presenting part F15 may color-code to display regions where the combinations of the incident angle and the reflection angle match each other on the target image and the reference image. For example, FIG. 18 illustrates target image P11, and FIG. 19 illustrates reference image P21. Region P111 of target image P11 and region P211 of reference image P21 have an identical color and identical combinations of the incident angle and the reflection angle. Region P112 of target image P11 and region P212 of reference image P21 have an identical color and identical combinations of the incident angle and the reflection angle. Region P113 of target image P11 and region P213 of reference image P21 have an identical color and identical combinations of the incident angle and the reflection angle. Further, region P114 of target image P11 and region P214 of reference image P21 have an identical color and identical combinations of the incident angle and the reflection angle. Therefore, it is possible to clearly show the regions that look the same in color on target image P11 and reference image P21.

Figure 20:
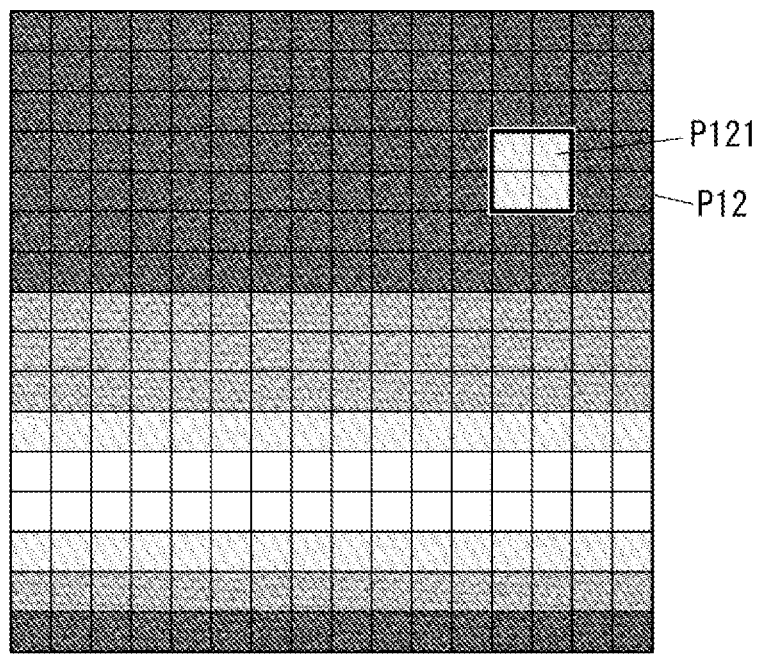
FIG. 20 is a diagram illustrating an example of the target image including an attention region determined as inacceptable.
Figure 21:
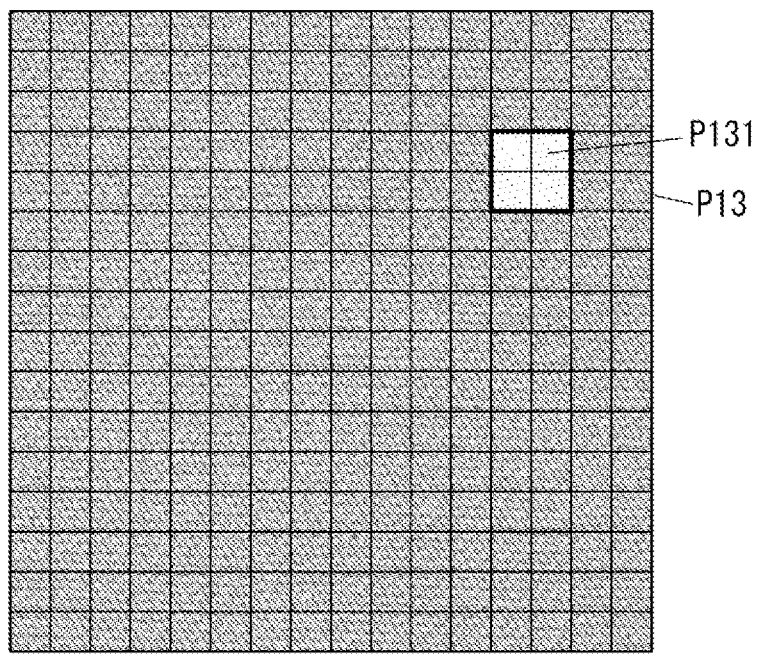
FIG. 21 is a diagram illustrating an example of the target image including an enhanced attention region determined as inacceptable.

In one modification, presenting part F15 may execute the result presenting step of performing presentation based on the comparison result in comparator F13 (the comparison result at the comparison step). As an example, presenting part F15 may perform presentation for clearly distinguishing between the attention region determined to be acceptable by determination part F14 and the attention region determined to be unacceptable as the comparison result in comparator F13. For example, in target image P12 illustrated in FIG. 20, the attention region included in region P121 is determined to be unacceptable, and the attention region not included in region P121 is determined to be acceptable. In this case, as illustrated in FIG. 21, presenting part F15 may present target image P13 in which the unacceptable attention region and the acceptable attention region are distinguished from each other. In FIG. 21, region P131 corresponds to region P121 of target image P12, and the attention region included in region P131 and the attention region not included in region P131 are shown in different colors. Further, the attention regions not included in region P131 are all shown in the identical color, unlike target image P12. Such presentation by presenting part F15 makes it possible to present the attention region (the attention region having abnormality) determined to be unacceptable in target image P12 in an easy-to-understand manner.

In one modification, inspection system 1 does not have to include determination part F12. For example, in a case where shape data regarding the shape of object 100 already exists, normal line N11 can be obtained from the shape data. Examples of the shape data include computer aided design (CAD) data. That is, in this case, incident angle θt and reflection angle φt in attention region P101 are determined in advance. Therefore, according to this aspect, the calculation of incident angle θt and reflection angle φt in attention region P101 can be omitted, and thus the processing can be simplified. Even if determination part F12 is not provided, comparator F13 can obtain incident angle θt and reflection angle φt. Thus, the configuration of inspection system 1 can be simplified.

In one modification, input and output part 11 may include an image display device. In this case, presenting part F15 may display the comparison result in comparator F13 and the determination result in determination part F14 on the image display device of input and output part 11. Further, input and output part 11 may include a sound output device. In this case, presenting part F15 may output the comparison result in comparator F13 and the determination result in determination part F14 from the sound output device of input and output part 11.

In one modification, the wavelength of light emitted by illumination system 20 may be changeable. This can be achieved by using light sources having different emission colors or color filters. In short, in inspection system 1, at least one of the wavelength of the light emitted from illumination system 20 and the wavelength of the light detected by imaging system 30 may be changeable.

In one modification, inspection system 1 may include a plurality of imaging systems 30. In this case, it is preferable to perform color calibration among the plurality of imaging systems 30. That is, in different imaging systems 30, pixel values may be different even in an identical color depending on individual difference of cameras or the like. Therefore, in a case where the plurality of imaging systems 30 is used, a color chart to be a reference together with object 100 may be imaged, and color calibration may be performed among the plurality of imaging systems 30 based on pixel values of pixels corresponding to the color chart.

In one modification, inspection system 1 (determination system 10) may include a plurality of computers. For example, the functions (in particular, acquisition part F11, determination part F12, comparator F13, determination part F14, and presenting part F15) of inspection system 1 (determination system 10) may be distributed to a plurality of apparatuses. Further, at least some of the functions of inspection system 1 (determination system 10) may be achieved by a cloud (cloud computing) or the like.

An execution entity of inspection system 1 (determination system 10) described above includes a computer system. The computer system includes a processor and a memory as hardware. The function as the execution entity of inspection system 1 (determination system 10) of the present disclosure is achieved by the processor executing a program recorded in the memory of the computer system. The program may be pre-recorded in the memory of the computer system or may be provided through an electric communication line. The program may be recorded and provided in a non-transitory recording medium, such as a memory card, an optical disc, or a hard disc drive, capable of being read by the computer system. The processor of the computer system includes one or a plurality of electronic circuits including a semiconductor integrated circuit (IC) or a large scale integrated circuit (LSI). A field programmable gate array (FGPA), an application specific integrated circuit (ASIC), or a reconfigurable logic device that can reconfigure a bonding relationship inside the LSI or set up a circuit section inside the LSI can also be used for the same purpose. The FGPA, the ASIC, or the logic device is programmed after the LSI is manufactured. The plurality of electronic circuits may be integrated into one chip or may be provided in a distributed manner on a plurality of chips. The plurality of chips may be integrated in one device or may be provided in a distributed manner in a plurality of devices.

(3) Aspects

As is apparent from the above exemplary embodiment and modifications, the present disclosure includes the following aspects. In the following, reference symbols are given in parentheses only to clarify the correspondence with the exemplary embodiment.

A first aspect is the inspection method including acquisition step (S11) and comparison step (S15, S16). Acquisition step (S11) is a step of acquiring target image (P10) of the surface of object (100) obtained by imaging system (30) imaging the surface of object (100) illuminated by illumination system (20). Comparison step (S15, S16) is a step of comparing the color of attention region (P101) of target image (P10, P11, P12, P13) with the color of reference region (P201). Reference region (P201) is a region of reference images (P20, P21) of the surface of reference object (200) as a reference of the color of object (100). Further, reference region (P201) is a region corresponding to the combination of incident angle (θt) of light (L11) from illumination system (20) in attention region (P101) and reflection angle (φt) of light (L12) to imaging system (30). According to this aspect, the accuracy of inspecting the color of the surface of object (100) can be improved.

A second aspect is an inspection method based on the first aspect. In the second aspect, target image (P10) includes the plurality of attention regions (P101). According to this aspect, the accuracy of inspecting the color of the surface of object (100) can be improved.

A third aspect is an inspection method based on the first or second aspect. In the third aspect, attention region (P101) is configured by a single pixel or a plurality of continuous pixels. According to this aspect, the accuracy of inspecting the color of the surface of object (100) can be improved.

A fourth aspect is an inspection method based on any one of the first to third aspects. In the fourth aspect, in comparison step (S15, S16), color histograms of the plurality of attention regions (P101) corresponding to the specific combination of the incident angle and the reflection angle are compared with color histograms of the plurality of reference regions (P201) of reference images (P20, P21) corresponding to the specific combination. According to this aspect, the accuracy of inspecting the color of the surface of object (100) can be improved.

A fifth aspect is an inspection method based on the fourth aspect. In the fifth aspect, in the specific combination, the incident angle is an angle within the first angle range, and the reflection angle is an angle within the second angle range. According to this aspect, the accuracy of inspecting the color of the surface of object (100) can be improved.

A sixth aspect is an inspection method based on the fourth or fifth aspect. In the sixth aspect, the plurality of attention regions (P101) includes the plurality of attention regions (P101) having the identical combinations of the incident angle and the reflection angle. The plurality of reference regions (P201) includes the plurality of reference regions (P201) having the identical combinations of the incident angle and the reflection angle. According to this aspect, the accuracy of inspecting the color of the surface of object (100) can be improved.

A seventh aspect is an inspection method based on any one of the first to sixth aspects. In the seventh aspect, in reference region (P201), incident angle (θr) of light (L21) from illumination system (20) in reference region (P201) is within the first angle range including incident angle (θt) of light (L11) from illumination system (20) in attention region (P101). Reflection angle (φr) of light (L22) from illumination system (20) in reference region (P201) is within the second angle range including reflection angle (φt) of light (L12) from illumination system (20) in attention region (P101). According to this aspect, the accuracy of inspecting the color of the surface of object (100) can be improved.

An eighth aspect is an inspection method based on any one of the first to seventh aspects. In the eighth aspect, the inspection method further includes determination step (S12, S13, S14) of determining incident angle (θt) and reflection angle (φt) in attention region (P101). According to this aspect, the accuracy of inspecting the color of the surface of object (100) can be improved.

A ninth aspect is an inspection method based on the eighth aspect. In the ninth aspect, in determination step (S12, S13, S14), incident angle (θt) and reflection angle (φt) in attention region (P101) are calculated using at least one image of object (100). According to this aspect, the accuracy of inspecting the color of the surface of object (100) can be improved.

A tenth aspect is an inspection method based on the eighth or ninth aspect. In the tenth aspect, in determination step (S12, S13, S14), a brightest region on target image (P10) is standard region (P102) where incident angle (θt) and reflection angle (φt) are equal to each other. According to this aspect, the accuracy of incident angle (θt) and reflection angle (φt) can be improved.

An eleventh aspect is an inspection method based on the tenth aspect. In eleventh aspect, the inspection method further includes image presenting step (S17) of displaying regions having the identical combinations of the incident angle and the reflection angle in the same mode on target image (P11) and reference image (P21). According to this aspect, it is possible to clearly indicate the regions that look the same in color on target image (P11) and reference image (P21).

A twelfth aspect is an inspection method based on any one of the first to eleventh aspects. In the twelfth aspect, the inspection method further includes the result presenting step (S17) of performing presentation based on the comparison result at comparison step (S15, S16). According to this aspect, it is possible to perform presentation based on the comparison result in comparison step (S15, S16).

A thirteenth aspect is an inspection method based on any one of the first to seventh aspects. In the thirteenth aspect, incident angle (θt) and reflection angle (φt) in attention region (P101) are determined in advance. According to this aspect, the calculation of incident angle (θt) and reflection angle (φt) in attention region (P101) can be omitted, and thus the processing can be simplified.

A fourteenth aspect is a program for causing at least one processor to execute the inspection method according to any one of the first to thirteenth aspects. According to this aspect, the accuracy of inspecting the color of the surface of object (100) can be improved.

A fifteenth aspect is inspection system (1) including acquisition part (F11) and comparator (F13). Acquisition part (F11) acquires target image (P10) of the surface of object (100) obtained by imaging system (30) imaging the surface of object (100) illuminated by illumination system (20). Comparator (F13) compares the colors of attention region (P101) on target image (P10, P11, P12, P13) with the color of reference region (P201). Reference region (P201) is a region of reference image (P20, P21) of the surface of reference object (200) as a reference of the color of object (100). Further, reference region (P201) is a region corresponding to the combination of incident angle (θt) of light (L11) from illumination system (20) in attention region (P101) and reflection angle (φt) of light (L12) to imaging system (30). According to this aspect, the accuracy of inspecting the color of the surface of object (100) can be improved.

According to the inspection method, the program, and the inspection system of the present disclosure, the accuracy of inspecting colors of surfaces of objects such as an automobile and an electrical appliance can be improved. As a result, an object having a surface having a desired color can be efficiently obtained. That is, the inspection method, the program, and the inspection system of the present disclosure are industrially useful.

The invention claimed is:
1. An inspection method comprising:
   illuminating a surface of an object with a light source of an illumination system and acquiring a target digital image of the surface of the object by using a camera including an image sensor in an imaging system;
   illuminating a surface of a reference object with the light source, and acquiring a reference digital image of the surface of the reference object by using the camera;
   comparing, using a processor, a color of a pixel of an attention region on the target digital image with a color of a pixel of a reference region of the reference digital image as a reference of a color of the object; and
   inspecting the color of the attention region based on a comparison result,
   wherein the reference region corresponds to a combination of an incident angle of light from the illumination system and a reflection angle of light to the camera in the attention region.

2. The inspection method according to claim 1, wherein:
the target image includes a plurality of attention regions each being the attention region, and
a color of each the plurality of attention regions is inspected.

3. The inspection method according to claim 1, wherein the attention region is constituted by a single pixel or a plurality of continuous pixels.

4. The inspection method according to claim 3, further comprising
acquiring color histograms of regions of the plurality of attention regions corresponding to combinations of the incident angle and the reflection angle and color histograms of regions of a plurality of reference regions each being the reference region on the reference image corresponding to the combinations; and
in the comparing a color histogram of regions of the plurality of attention regions corresponding to a specific combination of the incident angle and the reflection angle is compared with a color histograms of regions of the plurality of reference regions corresponding to the specific combination.

5. The inspection method according to claim 4, wherein in the combinations, the incident angle is an angle within a first angle range and the reflection angle is an angle within a second angle range.

6. The inspection method according to claim 4, wherein
the plurality of attention regions includes a plurality of regions having identical combinations of the incident angle and the reflection angle, and
the plurality of reference regions includes a plurality of regions having identical combinations of the incident angle and the reflection angle.

7. The inspection method according to claim 1, wherein in the reference region, an incident angle of light from the illumination system in the reference region is within a first angle range including the incident angle of the light from the illumination system in the attention region, and a reflection angle of light from the illumination system in the reference region is within a second angle range including a reflection angle of light from the illumination system in the attention region.

8. The inspection method according to claim 1, further comprising determining, by the processor, the incident angle and the reflection angle in the attention region.

9. The inspection method according to claim 8, wherein in the determining, the incident angle and the reflection angle in the attention region are calculated by the processor using at least one digital image of the object.

10. The inspection method according to claim 8, wherein in the determining, a brightest region on the target digital image is determined as a standard region where the incident angle and the reflection angle are equal to each other.

11. The inspection method according to claim 10, further comprising displaying regions having identical combinations of the incident angle and the reflection angle in an identical mode on the target image and the reference image.

12. The inspection method according to claim 1, further comprising displaying an inspection result.

13. The inspection method according to claim 1, wherein the incident angle and the reflection angle in the attention region are determined in advance.

14. An inspection system comprising:
an illumination system including a light source configured to illuminate a surface of a target object and a surface of a reference object;
a camera including an image sensor for acquiring a digital image; and
a processor functioning as:
an acquisition part that acquires a target digital image of the surface of the target object illuminated by the light source using the camera, and a reference digital image of the surface of the reference object illuminated by the light source using the camera;
a comparator that compares a color of a pixel of an attention region on the target digital image with a color of a pixel of a reference region of the reference digital image as a reference of a color of the object; and
an inspecting part that inspects the color of the attention region based on a comparison result,
wherein the reference region corresponds to a combination of an incident angle of light from the illumination system and a reflection angle of light to the imaging system on the attention region.

15. The inspection system according to claim 14, wherein the comparator compares a color histogram of regions of the plurality of the attention regions corresponding to a specific combination of the incident angle and the reflection angle with a color histogram of regions of a plurality of reference regions each being the reference region on the reference digital image corresponding to the specific combination.

16. The inspection system according to claim 14, wherein the processor further functions as a determination part that determines the incident angle and the reflection angle in the attention region.

17. The inspection method according to claim 1, wherein:
the attention region and the references region are constituted by a plurality of continuous pixels, respectively, and
in the comparing, an average or mode color of the plurality of continuous pixels of the attention region is compared with an average or mode color of the plurality of continuous pixels of the reference region.

18. The inspection system according to claim 14, wherein:
the attention region and the references region are constituted by a plurality of continuous pixels, respectively, and
the comparator compares an average or mode color of the plurality of continuous pixels of the attention region with an average or mode color of the plurality of continuous pixels of the reference region.

19. An inspection system comprising:
an illumination system including a light source configured to illuminate an object;
a digital camera for acquiring a digital image; and
a processor functioning as:
an acquisition part that acquires a target digital image of a surface of a target object illuminated by the light source using the digital camera, and a reference digital image of a surface of a reference object illuminated by the light source using the digital camera;
a comparator that compares a color of one or more pixels of an attention region on the target digital image with a color of one or more pixels of a reference region of the reference digital image as a reference of a color of the object; and
an inspecting part that inspects the color of the attention region based on a comparison result, wherein the reference region corresponds to a combination of an incident angle of light from the illumination system and a reflection angle of light to the imaging system on the attention region.

* * * * *